United States Patent

Phillips

[15] 3,642,252
[45] Feb. 15, 1972

[54] COMBINATION VALVE AND COUPLING
[72] Inventor: Robert F. Phillips, Baton Rouge, La.
[73] Assignee: Ethyl Corporation, New York, N.Y.
[22] Filed: Dec. 29, 1969
[21] Appl. No.: 888,753

[52] U.S. Cl. ............................................. 251/145, 285/212
[51] Int. Cl. ......................................... F16l 5/02, F16k 5/02
[58] Field of Search ................... 251/145, 309; 137/223, 315, 137/317, 320, 321, 322, 323; 285/161, 200, 208, 206, 209, 201, 210, 211, 212, 219, 220, 351, 352, 379; 85/32

[56] References Cited

UNITED STATES PATENTS

| 2,481,142 | 9/1949 | Mueller et al. | 285/212 |
| 3,525,363 | 8/1970 | Gore | 251/309 X |

FOREIGN PATENTS OR APPLICATIONS

| 14,773 | 10/1933 | Australia | 285/206 |
| 956,591 | 4/1964 | Great Britain | 285/270 |

Primary Examiner—William R. Cline
Attorney—Donald L. Johnson

[57] ABSTRACT

A combination valve and coupling particularly adapted for connection to plastic pipe. The valve provides a threaded lower portion which extends through a hole drilled in the plastic pipe and has a mating collar and a threaded nut receivable over the threaded portion of the pipe to couple the valve to the plastic pipe. The collar and nut have contoured surfaces approximating the shape of the wall of the plastic pipe.

4 Claims, 3 Drawing Figures

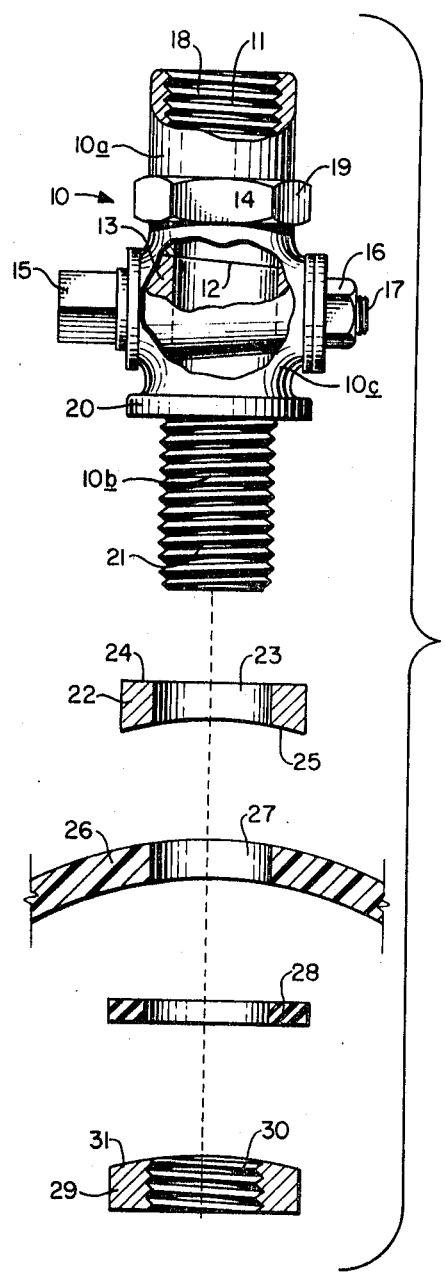
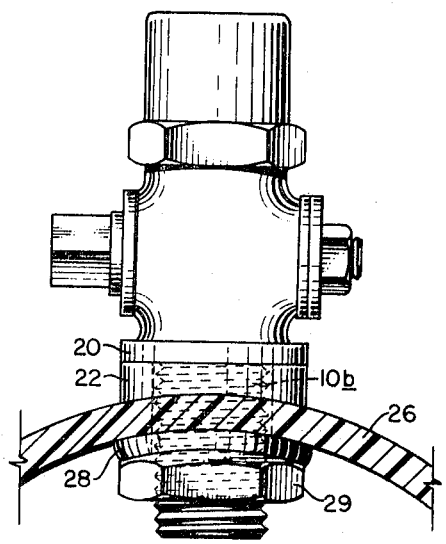
FIG. 2.
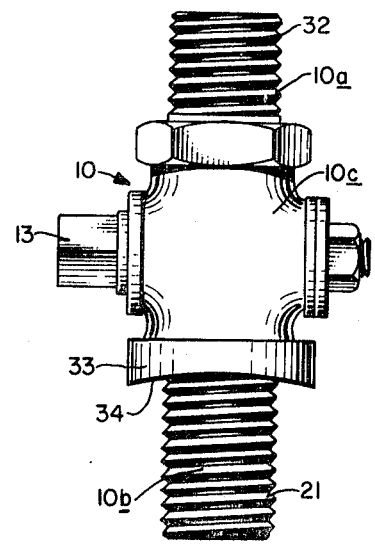
FIG. 3.
FIG. 1.

3,642,252

COMBINATION VALVE AND COUPLING

BACKGROUND OF THE INVENTION

1. Field of the Invention

This invention relates to a combination valve and coupling particularly adapted for connection to plastic pipe through the sidewall thereof.

2. Description of the Prior Art

Heretofore difficulty has been encountered in making connection between plastic pipe and metal pipe. Due to the inherent weakness of the walls of plastic pipe, conventional threaded connections between plastic pipe and metallic fittings have not been practicable. A commonly used device for coupling a metallic connector to a plastic pipe utilizes a saddle clamp whereby a conventional metal fitting is installed in an opening drilled in the sidewall of the pipe and is seated against a resilient gasket seal by means of a cylindrical saddle clamp bearing on a collar or other projection provided on the lower portion of the metallic fitting. These devices are complicated, expensive and difficult to install. Additionally, they are prone to leakage and deterioration due to corrosion of the metal saddle clamp.

One type of corporation stop valve adapted to be connected through the sidewall of plastic pipe is disclosed in U.S. Pat. No. 2,481,142. The valve may be attached to a pipe containing fluid under pressure; however, it requires the use of specially designed drilling and inserting devices. Additionally, this corporation stop involves the use of a number of special components not readily available.

Thus, there has been a long felt need for a suitable coupling device for connecting a valve to the sidewall of a plastic pipe.

SUMMARY OF THE INVENTION

It is an object of the present invention to provide a combination valve and coupling for connection to plastic pipe which is conveniently installed.

It is also an object of the present invention to provide a combination valve and coupling for plastic pipe which is composed of a minimum number of components of simple design.

It is another object of the present invention to provide a combination valve and coupling for attachment to plastic pipe which can be readily adapted for connection to various sizes of plastic pipe.

The foregoing objects are realized in a combination valve and coupling which includes a valve body having a longitudinal flow passage therethrough, the body having a generally cylindrical threaded upper portion and a generally cylindrical lower portion having threads on its exterior surface. Means are provided in the valve body intermediate the upper and lower portions to open and close the flow passage. A shoulder is positioned at the upper end of the lower portion of the valve body and a collar is received over the lower portion and abuts the shoulder. The collar has an arcuate shaped surface on the side opposite the shoulder conforming generally to the shape of the outer wall of a cylindrical conduit. A flexible gasket is received over the lower portion and is adapted to contact and conform to the shape of the inner wall of a cylindrical conduit. A threaded nut is received on the lower portion below the gasket. The nut has an arcuate shaped upper surface conforming generally to the shape of the inner wall of the cylindrical conduit.

BRIEF DESCRIPTION OF THE DRAWINGS

FIG. 1 is an elevational, exploded, partially sectional view of a combination valve and coupling of the present invention;

FIG. 2 is an elevational view of the combination valve and coupling of FIG. 1 coupled to a sidewall of a plastic pipe; and FIG. 3 is an elevational view of another embodiment of the valve and coupling of the present invention.

DESCRIPTION OF THE PREFERRED EMBODIMENTS

Referring now to FIG. 1 the combination valve and coupling of the present invention, often referred to as a corporation stop, includes a valve body designated generally by the numeral 10. The body is provided with an upper portion 10a, a central portion 10c, and a lower portion 10b. The body is provided with a generally cylindrical, longitudinally extending, central passage 11. The central portion of the valve body 10c is provided with a tapered transverse opening 12 therethrough. Received in the transverse opening 12 is a valve plug member 13 provided with a central cylindrical bore 14 alignable with the longitudinal passage 11 in the valve body. One end of the valve plug member is provided with a generally rectangular end 15 adapted to accept a wrench to rotate valve plug member 13 to close or open the passage 11 through the valve body. The nut 16 received on the opposite threaded end 17 of the valve plug retains the plug within the valve body. The upper portion 10a of the valve body is provided with threads 18 on its interior wall whereby the threaded end of a pipe may be coupled directly into the top of the combination valve and coupling. However, if desired, the top can be unthreaded and incorporate a flared connection such as used in copper tubing connections. A lower segment of the upper portion 10a is provided with an integrally formed nut 19 whereby the combination valve and coupling may be rotated with a wrench to connect the valve to a plastic pipe. The lower end of the central portion 10c of the valve body terminates in an integrally formed, transversely extending shoulder 20. External threads 21 are provided on the lower portion 10b of the valve body.

An annular collar 22 having a central cylindrical opening 23 is adapted to be received over the lower portion 10b of the valve body. The collar preferably is not threaded on its interior wall. The collar has a flat upper surface 24 and an arcuate shaped lower surface 25 conforming generally to the shape of the outer wall of the cylindrical conduit 26. The above described parts of the valve and coupling assembly of the present invention are positioned above the generally cylindrical plastic conduit 26 (only a portion of which is shown). The conduit is provided with a generally cylindrical opening 27 in its sidewall. An annular gasket 28 made of a resilient material such as rubber is positioned within conduit 26 and is adapted to be received over the lower portion 10b of the valve body. A nut 29 provided with internal threads 30 is adapted to be threaded onto the lower portion 10b of the valve body. This nut has a generally arcuate-shaped upper surface 31 adapted to conform to the shape of the inner wall of the cylindrical conduit 26.

As seen in FIG. 2 the annular collar 22 is received over the lower threaded portion 10b of the valve body and abuts the underside of shoulder 20. The arcuate shaped lower surface of collar 22 makes a tight-fitting engagement with the cylindrical outer wall of the conduit 26. A resilient gasket 28 is placed over the lower portion of the valve body 10b which extends into the interior of the conduit 26 and is compressed tightly against the inner wall of the conduit by means of threaded nut 29 to provide a leakproof connection.

Referring now to FIG. 3, this embodiment of the combination valve and coupling of the present invention provides an upper portion 10a having exterior pipe threads 32 thereon. The central portion 10c of the valve body and the valve plug member 13 are the same as that shown in the embodiment depicted in FIGS. 1 and 2. The lower end of the central portion of the valve body terminates in an integrally formed collar 33 having an arcuate-shaped lower surface 34 which is adapted to abut the outer cylindrical surface of the cylindrical conduit 26. The lower portion 10b has exterior threads 21 the same as in the embodiment seen in FIG. 1. Similar flexible gasket and nut may be used to attach the device to the conduit as are used in FIG. 1.

The combination valve and coupling of the present invention can be made in various sizes to accommodate connection with various sizes of plastic pipe. A particular advantage of the present device is that one standard size valve and coupling may be utilized for connection to plastic pipe of various diameters. By providing a plurality of sets of the annular collar 22 and nut 29 having different arcuate shapes to match the inner and outer wall contour of different diameter pipe, one standard valve may be utilized for coupling to many different sizes of pipe. In the embodiment of the invention shown in FIG. 3 the arcuate surface 34 would be contoured for a particular diameter of plastic pipe.

While it is preferred that the combination valve and coupling of the present invention be constructed from a metal such as brass, bronze, galvanized iron and other suitable metals, the device can also be made from numerous plastic materials such as polyvinyl chloride, polyethylene, polypropylene, acrylonitrile-butadiene-styrene copolymer, phenol-formaldehyde type resins and others.

The combination valve and coupling is conveniently attached to the terminal end of plastic water service lines which lead from the water main up to a building. A suitable sized opening is bored in the sidewall of the plastic pipe adjacent the end thereof and before sealing the end. The valve and coupling can be readily attached by inserting the valve through the opening and placing the gasket and nut thereover prior to closing the end of the pipe. After the assembly is coupled tightly to the pipe, the end of the pipe may be sealed by conventional means such as adhesively attaching a cap or use of a blind flange.

While there has been described what is at present considered preferred embodiments of the present invention, it will be apparent to those skilled in the art that various modifications and changes may be made without departing from the essence of the invention. It is intended herein to cover all such modifications and changes that come within the true scope of the following claims.

What is claimed is:

1. In a combination valve and coupling the combination comprising:
   a. a valve body having a longitudinal flow passage, said body having a generally cylindrical threaded upper portion provided with an integrally formed nut on the exterior surface thereof and a generally cylindrical lower portion having threads on its exterior surface;
   b. means in said valve body intermediate said upper and lower portions to open and close said passage;
   c. an integrally formed shoulder positioned at the upper end of said lower portion of said valve body;
   d. a collar received over said lower portion and abutting said shoulder, said collar having an arcuate-shaped surface on the side opposite said shoulder conforming generally to the shape of the outer wall of a cylindrical conduit;
   e. a flexible gasket received over said lower portion adapted to contact and conform to the shape of the inner wall of a cylindrical conduit; and
   f. a threaded nut having a plurality of flat surfaces on its periphery received on said lower portion below said gasket, said nut having an arcuate-shaped upper surface conforming generally to the shape of the inner wall of a cylindrical conduit.

2. The combination valve and coupling of claim 1 wherein said upper portion is provided with threads on its interior wall.

3. The combination valve and coupling of claim 1 wherein said body has a central transverse opening therethrough and a rotatable valve plug received in said transverse opening.

4. The combination valve and coupling of claim 1 wherein said flexible gasket is made from a rubber material.

* * * * *